United States Patent
Hamada et al.

(10) Patent No.: US 6,859,648 B2
(45) Date of Patent: Feb. 22, 2005

(54) SEMICONDUCTOR INTEGRATED CIRCUIT DEVICE

(75) Inventors: Mototsugu Hamada, Yokohama (JP); Hiroki Ishikuro, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 460 days.

(21) Appl. No.: 10/142,050

(22) Filed: May 10, 2002

(65) Prior Publication Data

US 2003/0194983 A1 Oct. 16, 2003

(30) Foreign Application Priority Data

Apr. 10, 2002 (JP) ........................................ 2002-108081

(51) Int. Cl.[7] ............................................... H04B 1/10
(52) U.S. Cl. ................... 455/302; 455/343.1
(58) Field of Search .......................... 455/192.1, 192.2, 455/323, 324, 343.1, 302, 296; 375/344, 346

(56) References Cited

U.S. PATENT DOCUMENTS 6,282,413 B1 * 8/2001 Baltus ........................ 455/260

FOREIGN PATENT DOCUMENTS

| EP | 1282279 A2 * | 5/2003 |
| JP | 8-130416 | 5/1996 |

* cited by examiner

*Primary Examiner*—Nguyen Vo
(74) *Attorney, Agent, or Firm*—Oblon, Spivak, McClelland, Maier & Neustadt, P.C.

(57) ABSTRACT

A semiconductor integrated circuit device includes a first phase shifter configured to make a phase difference of 90 degrees between local signals, first and second mixer circuits configured to mix the local signals with a received signal, a second phase shifter configured to make a phase difference of 90 degrees between output signals of the first and second mixer circuits to output first and second output signals, an adder configured to add the first and second output signals, a subtracter configured to subtract the first and second output signals, a signal intensity detector configured to compare between an intensity of an output signal of the subtracter with a reference level intensity, and a power supply control circuit configured to disable either of the first and second mixer circuits or either of the first and second mixer circuits and the first phase shifter according to a comparison result.

17 Claims, 5 Drawing Sheets

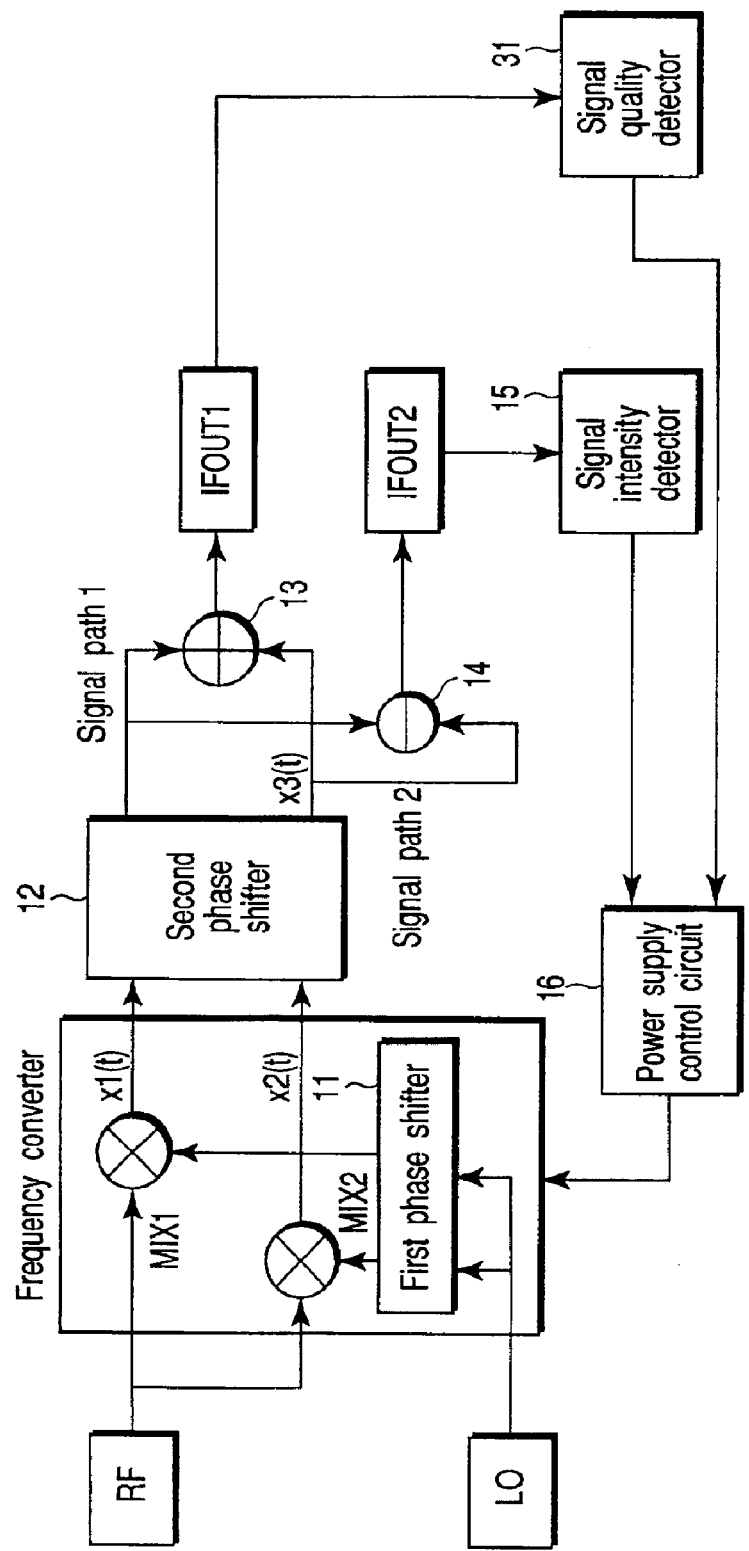
F I G. 6

SEMICONDUCTOR INTEGRATED CIRCUIT DEVICE

CROSS-REFERENCE TO RELATED APPLICATIONS

This application is based upon and claims the benefit of priority from the prior Japanese Patent Application No. 2002-108081, filed Apr. 10, 2002, the entire contents of which are incorporated herein by reference.

BACKGROUND OF THE INVENTION

1. Field of the Invention

The present invention relates to a semiconductor integrated circuit device having a mixer built in.

2. Description of the Related Art

In wireless communication, an image rejection mixer is frequently used in order to effect a reduction in cost. This image rejection mixer does not require a built-on image rejection filter but instead uses two mixer circuits MX1 and MX2 as shown in FIG. 7, which results in an increase in power dissipation.

The operation of the conventional image rejection mixer will be described with reference to FIGS. 7 and 8. In the description which follows, it is assumed that $\omega i > \omega LO > \omega d$ and $\omega IF = \omega LO - \omega d$. A radio-frequency received signal (hereinafter referred to as an RF signal) containing an image signal is represented by $\cos \omega dt + \cos \omega it$, and a local signal (hereinafter referred to as an LO signal), which is a conversion carrier signal, is represented by $\cos \omega L0$ (amplitudes are omitted for simplicity).

First, an RF signal is input to each of the first and second mixer circuits MIX1 and MIX2, which are supplied with LO signals between which a phase difference of 90 degrees has been introduced through a first phase shifter 11. Consider here that the LO signal input to the first mixer circuit MIx1 has its phase shifted by 90 degrees and the phase of the LO signal to the second mixer circuit MIX 2 remains unchanged.

The RF signal and the LO signal are mixed in each of the mixer circuits MIx1 and MIX2. As a result, intermediate-frequency signals (hereinafter referred to as IF signals) x1(t) and x2(t) are output from the mixer circuits MIx1 and MIX2, respectively. These IF signals have their high-frequency components removed through lowpass filters and are represented by $$x1(t) = (\cos\omega dt + \cos\omega it) \times \{\cos(\omega \ LOt - \pi/2)\} \quad (1)$$
$$= (1/2)\{\sin(\omega d + \omega LO) + \sin(\omega d - \omega LO) +$$
$$\sin(\omega i + \omega LO) + \sin(\omega i - \omega LO)\}$$
$$= (1/2)\{\sin(\omega d + \omega LO) + \sin(\omega d - \omega LO) +$$
$$\sin(\omega i + \omega LO) - \sin(\omega LO - \omega i)\}$$
$$= (1/2)\{\sin(\omega d - \omega LO) - \sin(\omega LO - \omega i)\}$$

$$x2(t) = (\cos\omega dt + \cos\omega it) \times \cos\omega LOt \quad (2)$$
$$= (1/2)\{\cos(\omega d + \omega LO) + \cos(\omega d - \omega LO) +$$
$$\cos(\omega i + \omega LO) + \cos(\omega i - \omega LO)\}$$
$$= (1/2)\{\cos(\omega d + \omega LO) + \cos(\omega d - \omega LO) +$$
$$\cos(\omega i + \omega LO) + \cos(\omega LO - \omega i)\}$$
$$= (1/2)\{\cos(\omega d - \omega LO) + \cos(\omega LO - \omega i)\}$$

Next, a phase shift of 90 degrees is introduced between the IF signals x1(t) and x2(t) in the second phase shifter 12. It is assumed here that the phase of the IF signal x2(t) is shifted by 90 degrees and the phase of the IF signal x1(t) is not shifted. Therefore, the IF signal x1(t) is output as it is onto a signal path 1 and an IF signal x3(t) is output onto a signal path 2, which is represented by $$x3(t) = (1/2)\{\cos(\omega d - \omega LO - \pi/2) + \cos(\omega LO - \omega i - \pi/2)\} \quad (3)$$
$$= (1/2)\{\sin(\omega d - \omega LO) + \sin(\omega LO - \omega i)\}$$

The IF signals x1(t) and x3(t) are next added together in an adder 13 to produce a signal IFOUT1, which is represented by $$IFOUT1 = x1(t) + x3(t) \quad (4)$$
$$= (1/2)\{\sin(\omega d - \omega LO) - \sin(\omega LO - \omega i) +$$
$$\sin(\omega d - \omega LO) + \sin(\omega LO - \omega i)\}$$
$$= \sin(\omega d - \omega LO)$$
$$= -\sin(\omega LO - \omega d)$$

As indicated by expression (4), a desired component $\omega d$ only is left in $\omega IF$ (=$\omega L0-\omega d$). That is, adding x1(t) and x3(t) together allows the image signal to be rejected without using an external filter.

In comparison with the external image rejection filter, however, the conventional image rejection mixer has a problem of large power dissipation because of the provision of two mixer circuits.

BRIEF SUMMARY OF THE INVENTION

According to an aspect of the present invention, there is provided a semiconductor integrated circuit device comprising: a first phase shifter configured to make a phase difference of 90 degrees between local signals, first and second mixer circuits configured to mix the local signals made the phase difference with a received signal, a second phase shifter configured to make a phase difference of 90 degrees between output signals of the first and second mixer circuits to output first and second output signals made the phase difference, an adder configured to add the first and second output signals, a subtracter configured to subtract the first and second output signals, a signal intensity detector configured to compare between an intensity of an output signal of the subtracter with a reference level intensity, and a power supply control circuit configured to disable either of the first and second mixer circuits or either of the first and second mixer circuits and the first phase shifter according to a comparison result of the intensity of the output signal of the subtracter and the reference level intensity.

BRIEF DESCRIPTION OF THE SEVERAL VIEWS OF THE DRAWING

FIG. 6 is a schematic diagram of a semiconductor integrated circuit device according to a third embodiment of the present invention;

DETAILED DESCRIPTION OF THE INVENTION

Figure 1:
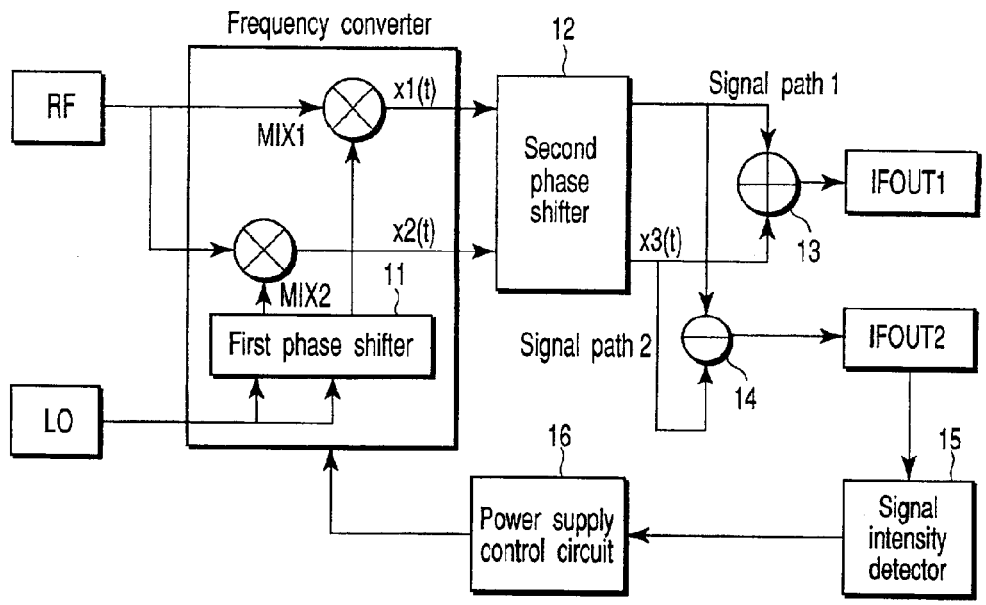
FIG. 1 is a schematic diagram of a semiconductor integrated circuit device according to a first embodiment of the present invention.

The preferred embodiments of the present invention will be described with reference to the drawings. Like components are shown by corresponding reference numerals throughout several views of the drawings.

[First Embodiment]

The first embodiment is adapted to detect the intensity of an image signal and disable part of circuits that constitute a frequency converter according to the detected intensity of the image signal.

FIG. 1 is a schematic diagram of a semiconductor integrated circuit device according to the first embodiment of the present invention. As shown in FIG. 1, this integrated circuit device comprises a first mixer circuit MIX1, a second mixer circuit MIX2, a first phase shifter 11, a second phase shifter 12, an adder 13, a subtracter 14, a signal intensity detector 15, and a power supply control circuit 16. The signal intensity detector 15 detects the intensity of the image signal to produce a signal whose magnitude corresponds to the detected intensity of the image signal. The power supply control circuit 16 is responsive to the output signal of the signal intensity detector 15 to control the frequency converter 16.

The operation of the semiconductor integrated circuit of the first embodiment will be described. In the description which follows, it is assumed that $\omega i > \omega LO > \omega d$ and $\omega IF = \omega LO - \omega d$. A radio-frequency received signal (hereinafter referred to as an RF signal) containing an image signal is represented by $\cos \omega dt + \cos \omega it$, and a local signal (hereinafter referred to as an LO signal), which is a conversion carrier signal, is represented by $\cos \omega LO$ (amplitudes are omitted for simplicity).

First, an RF signal is input to each of the first and second mixer circuits MIX1 and MIX2, which are also supplied with LO signals between which a phase difference of 90 degrees has been introduced through the first phase shifter 11. Assume here that the LO signal input to the first mixer circuit MIX1 has its phase shifted by 90 degrees and the phase of the LO signal to the second mixer circuit MIX2 remains unchanged.

The RF signal and the LO signal are mixed in each of the mixer circuits MIX1 and MIX2. As a result, intermediate-frequency signals (hereinafter referred to as IF signals) x1(t) and x2(t) are output from the mixer circuits MIX1 and MIX2, respectively.

Next, a phase shift of 90 degrees is introduced between the IF signals x1(t) and x2(t) in the second phase shifter 12. It is assumed here that the phase of the IF signal x2(t) is shifted by 90 degrees and the phase of the IF signal x1(t) is not shifted. Therefore, the IF signal x1(t) is output as it is onto the signal path 1 and the IF signal x3(t) is output onto a signal path 2.

Next, the IF signals x1(t) and x3(t) are added together in the adder 13 to produce an IFOUT1 signal. On the other hand, the IF signal x3(t) is subtracted from the IF signal x1(t) in a subtracter 14 to produce an IFOUT2 signal. As a result, only the desired component $\omega d$ appears in the IFOUT1 signal and only the image frequency component $\omega i$ appears in the IFOUT2 signal as indicated by $$IFOUT1 = x1(t) + x3(t) \quad (5)$$
$$= (1/2)\{\sin(\omega d - \omega LO) - \sin(\omega LO - \omega i) +$$
$$\sin(\omega d - \omega LO) + \sin(\omega LO - \omega i)\}$$
$$= \sin(\omega d - \omega LO)$$
$$= -\sin(\omega LO - \omega d)$$

$$IFOUT2 = x1(t) - x3(t) \quad (6)$$
$$= (1/2)\{\sin(\omega d - \omega LO) - \sin(\omega LO - \omega i) -$$
$$\sin(\omega d - \omega LO) - \sin(\omega LO - \omega i)\}$$
$$= -\sin(\omega LO - \omega i)$$
$$= \sin(\omega i - \omega LO)$$

The IFOUT2 signal is input to the signal intensity detector 15 in which a signal intensity value as a reference value is set. When the intensity of the IFOUT2 signal is larger than the reference value, the power supply control circuit 16 enables all the first and second mixer circuits MIX1 and MIX2 and the first phase shifter 11 to operate. If, on the other hand, the intensity of the IFOUT2 signal is less than the reference value, the power supply control circuit 16 disables the second mixer circuit MIX2 from operating. In a state where the second mixer circuit MIX2 is inoperative, the IF signals x1(t) and x2(t) are input to the second phase shifter 12. At this point, since the second mixer circuit MIX2 is inoperative, the IF signal x2(t) is a direct-current signal rather than a signal resulting from mixing the RF signal and the LO signal.

When the intensity of the IFOUT2 signal is less than the reference value, it is only required to disable either of the first and second mixer circuits MIX1 and MIX2. In addition to either of the first and second mixer circuits MIX1 and MIX2, the first phase shifter 11 may also be disabled. Further, it is also possible to disable the signal intensity detector 15.

The reference level can be set to conform to the image rejection specifications in a communication system. For example, reference may be made to the minimum receivable level. In this case, when the intensity of the IFOUT2 signal is less than the minimum receivable level, some of the circuits in the frequency converter can be disabled.

The reference level can be represented by expressions (7) and (8). For example, assume that the S/N ratio required by the system is R (dB) and the intensity in the system sensitivity specifications is S (dBm) (0 dBm=1 mW). If, when the intensity of the desired signal is S (dBm), the intensity of the IFOUT2 signal (image signal) is less than S−R (dBm), there is no need for image rejection because the S/N ratio required may be R (dB). When expression (7) below is satisfied, therefore, some of the circuits in the frequency converter may be disabled.

$$\text{IFOUT2 signal intensity} < S-R \text{ (dB)} \quad (7)$$

In practice, however, a margin of M (dB) is taken into consideration and, when the intensity of the IFOUT2 signal is less than S−R−M (dBm) as indicated by expression (8), some of the circuits in the frequency converter will be disabled.

$$\text{IFOUT2 signal intensity} < S-R-M \text{ (dBm)} \quad (8)$$

Making M too small results in a displacement from an ideal case through some influence, failing to meet specifications. Conversely, making M too large results in a reduction in the number of chances for disabling some of the circuits in the frequency converter, lessening the power saving effect. For this reason, with the wireless short-distance communication system "Bluetooth" (registered trademark), S is set to −70 or below and R is set to 11. In this case, M is set to be of the order of 3 to 6. The S, R and M values vary with communication specifications, product specifications, and design specifications.

According to the first embodiment, the IF signal x3(t) is subtracted from the IF signal x1(t) to produce the IFOUT2 signal in which only the image frequency component $\omega_i$ is contained and then the intensity of the IFOUT2 signal is compared with the reference level. According to the result of the comparison (for example, when the intensity of the IFOUT2 signal is less than the reference level), either of the first and second mixer circuits MIX1 and MIX2 or the first phase shifter 11 as well as either of the first and second mixer circuits MIX1 and MIX2 are disabled. Thereby, it is possible to decrease power dissipation of the frequency converter.

Figure 2:
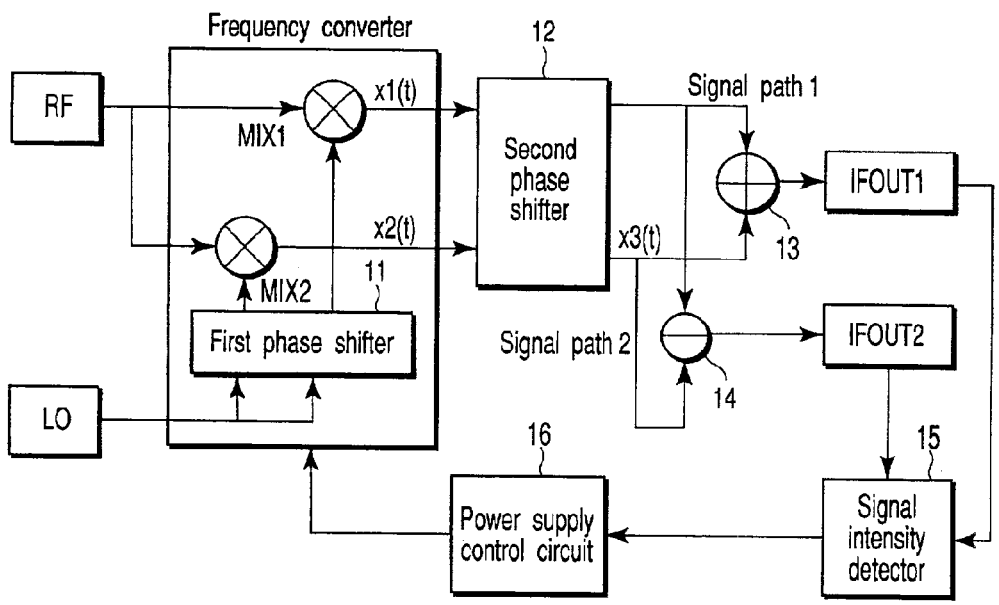
FIG. 2 is a schematic diagram of other semiconductor integrated circuit device according to the first embodiment of the present invention.

The reference level set in the signal intensity detector 15 is not limited to the above examples. For example, as shown in FIG. 2, the IFOUT1 signal may be input to the signal intensity detector 15 to produce a reference level corresponding to the intensity of the IFOUT1 signal.

The reference level in this case can be represented by expression (9) or (10) below. For example, if, when the S/N ratio required by the system is set to R (dB), the IFOUT1 signal containing the desired frequency component is larger in magnitude than the IFOUT2 signal containing the image frequency component by R (dB), there is no need for image rejection. When expression (9) below is met, therefore, some of the circuits of the frequency converter may be disabled.

IFOUT2 signal intensity<IFOUT1 signal intensity—R (dBm)  (9)

In practice, however, a margin of M (dB) is taken into consideration and, when the intensity of the IFOUT1 signal is (R+M) dB larger than that of the IFOUT2 signal as indicated by expression (10) below, some of the circuits in the frequency converter will be disabled.

IFOUT2 signal intensity<IFOUT1 signal intensity
—R—M (dBm)  (10)

Making M too small results in a displacement from an ideal case through some influence, failing to meet specifications. Conversely, making M too large results in fewer chances for disabling some of the circuits in the frequency converter, lessening the power saving effect. For this reason, with the wireless short-distance communication system "Bluetooth", R is set to 11. In this case, M is set to be of the order of 3 to 6. The R and M values vary with communication specifications, product specifications, and design specifications.

[Second Embodiment]

Figure 3:
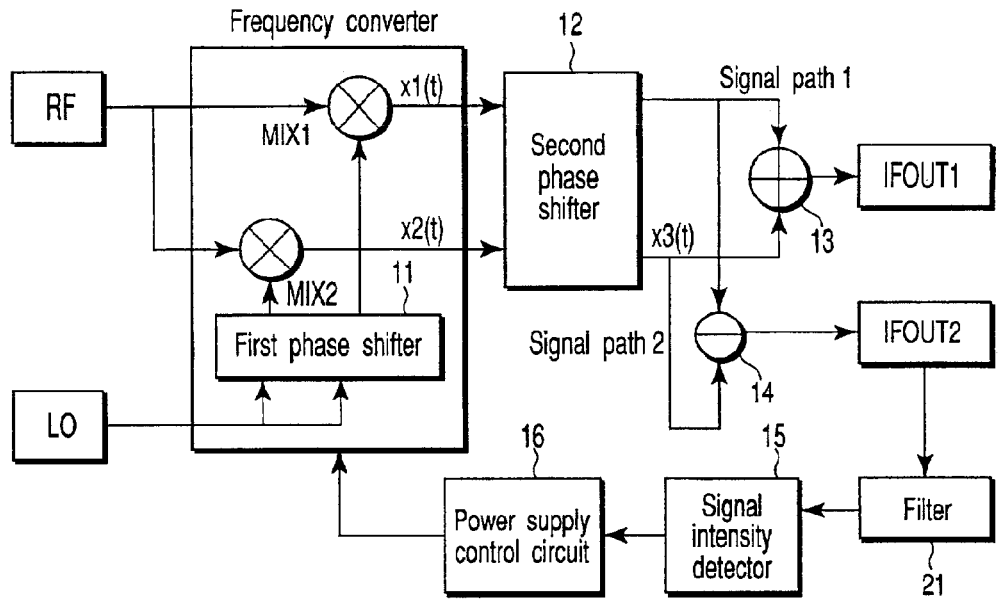
FIG. 3 is a schematic diagram of a semiconductor integrated circuit device according to a second embodiment of the present invention.

FIG. 3 is a schematic diagram of a semiconductor integrated circuit device according to a second embodiment of the present invention. The second embodiment has a filter in addition to the arrangement of the first embodiment. That is, the semiconductor integrated circuit device of the second embodiment differs from that of the first embodiment in that, as shown in FIG. 3, between the subtracter 14 and the signal intensity detector 15 is provided a filter 21 that extracts a disturbing signal component from the signal according to the output signal of the subtracter 14.

The semiconductor integrated circuit device of the second embodiment operates as follows. Here, only the points that make the second embodiment differ from the first embodiment will be described.

First, the IF signals x1(t) and x3(t) are added together in the adder 13 to produce the IFOUT1 signal. On the other hand, the IF signal x3(t) is subtracted from the IF signal x1(t) in the subtracter 14 to produce the IFOUT2 signal. As a result, only the desired frequency component $\omega_d$ appears in the IFOUT1 signal (refer to expression (5)) and only the image frequency component $\omega_i$ appears in the IFOUT2 signal (refer to expression (6)).

The IFOUT2 signal is then input to the filter 21 to take out only a disturbing frequency component having a great influence on the desired frequency component. The signal passed through the filter 21 is input to the signal intensity detector 15 in which a signal intensity value as a reference level has been set. When the intensity of the IFOUT2 signal passed through the filter 21 is higher than the reference level, the power supply control circuit 16 controls all the first and second mixer circuits MIX1 and MIX2 and the first phase shifter 11 to operate. On the other hand, when the intensity of the IFOUT2 signal passed through the filter 21 is lower than the reference level, the power supply control circuit 16 disables either of the first and second mixer circuits MIX1 and MIX2 or the first phase shifter 11 as well as either of the first and second mixer circuits MIX1 and MIX2 from operating.

The second embodiment can provide the same advantages as the first embodiment.

Further, the second embodiment is provided with the filter 21 between the subtracter 14 and the signal intensity detector 15. Thereby, only the disturbing signal component in the vicinity of the image frequency can be extracted from the IFOUT2 signal. Therefore, since only the intensity of the disturbing signal component in the IFOUT2 signal is compared with the reference level, more chances for the intensity of the IFOUT2 signal to fall below the reference level can be expected than in the first embodiment. For this reason, the chances for disabling some of the first and second mixer circuits MIX1 and MIX2 and the first phase shifter 11 can be increased, allowing for a further reduction in power dissipation.

Figure 4:
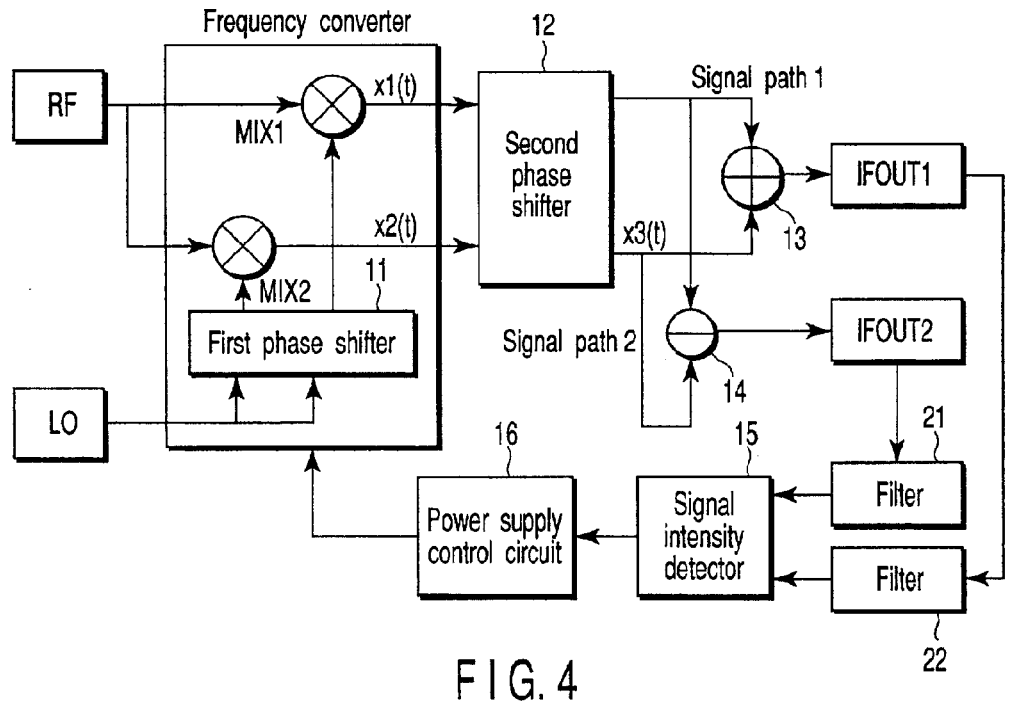
FIGS. 4 and 5 are schematic diagrams of other semiconductor integrated circuit devices according to the second embodiment of the present invention.
Figure 5:
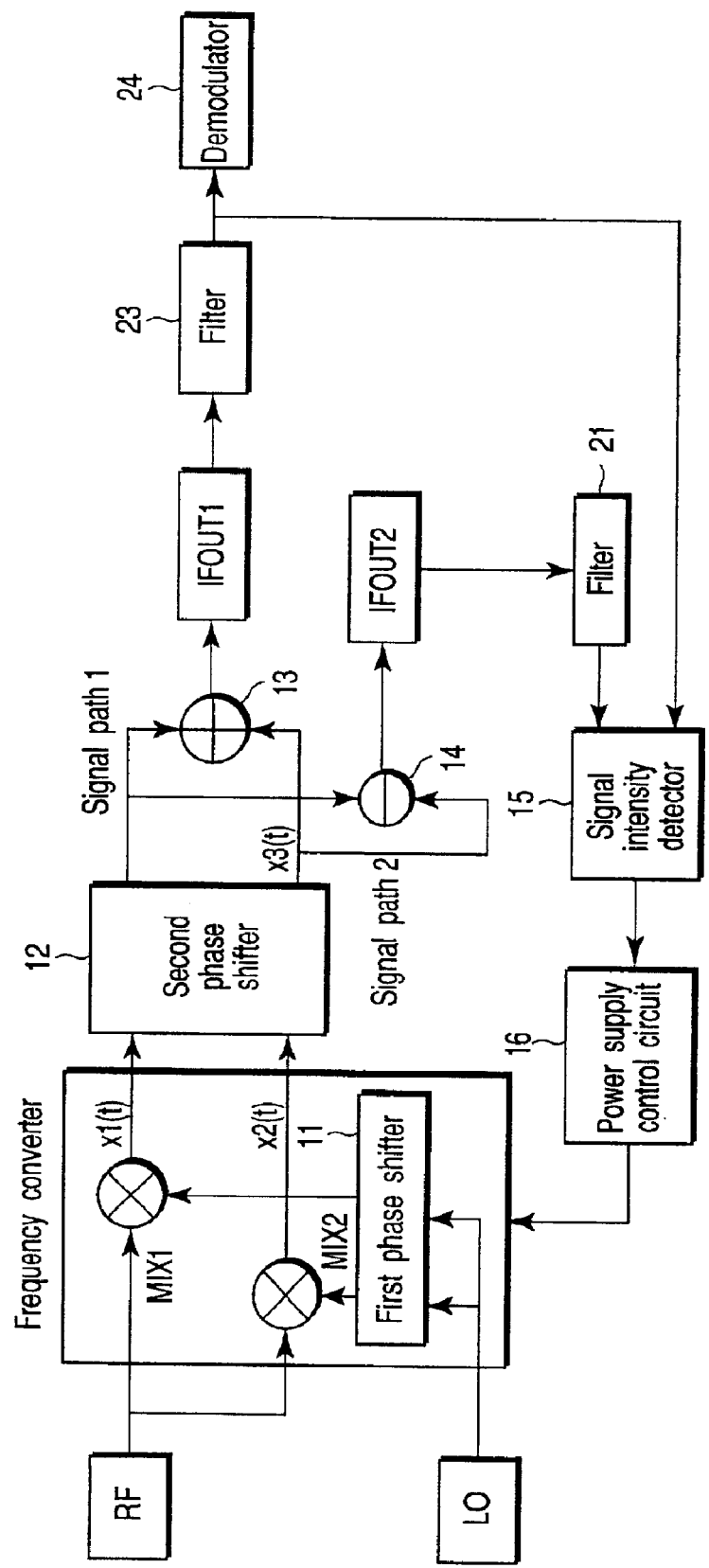
Figure 7:
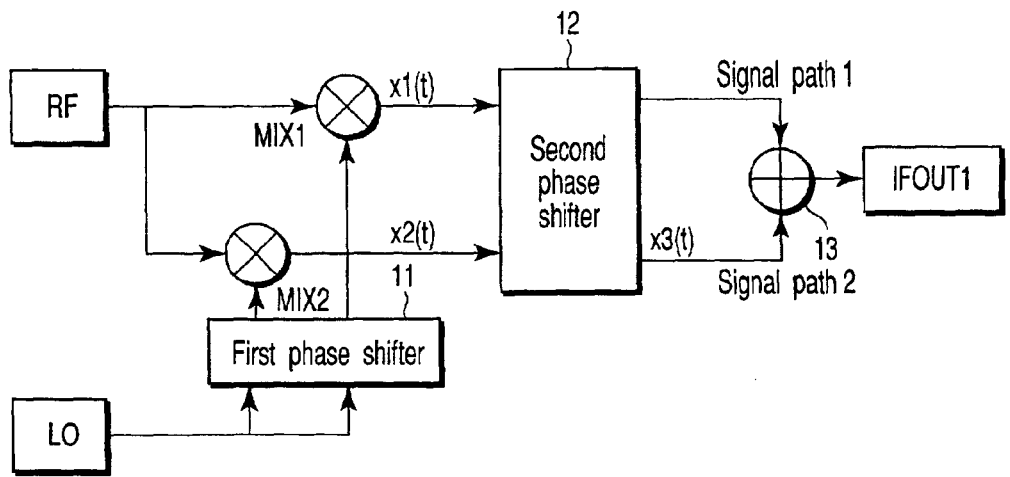
FIG. 7 is a schematic diagram of a conventional semiconductor integrated circuit device.
Figure 8:
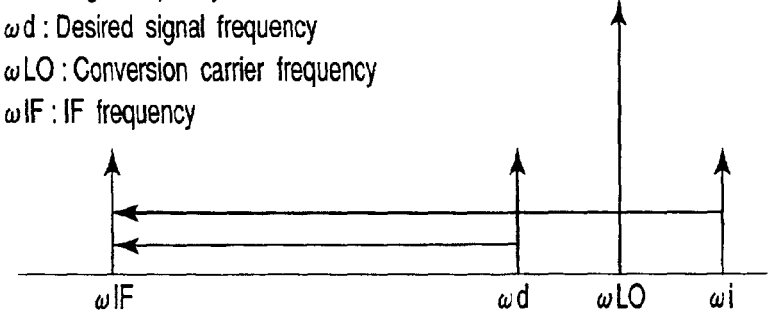
FIG. 8 shows a relationship among signal frequencies in the conventional integrated semiconductor circuit device.

In order to employ the intensity of the IFOUT1 signal as a reference level in the signal intensity detector 15, a filter 22 may be connected between the adder 13 and the signal intensity detector 15 as shown in FIG. 4. As an alternative, a filter 23 may be connected between the adder 13 and a demodulator 24 as shown in FIG. 5, in which case an output signal of that filter 23 can be input to the signal intensity detector 15. In such an example shown in FIG. 4 or 5, a comparison is made in the signal intensity detector 15 between the intensity of the disturbing signal component extracted by the filter 21 and the intensity of the desired signal component extracted by the filter 22 or 23.

[Third Embodiment]

FIG. 6 is a schematic diagram of a semiconductor integrated circuit device according to a third embodiment of the present invention. The third embodiment has a signal quality detector in addition to the arrangement of the first embodiment. That is, the semiconductor integrated circuit device of the third embodiment differs from that of the first embodiment in that, as shown in FIG. 6, a signal quality detector 31 that detects the quality of the IFOUT1 signal is provided between the adder 13 and the power supply control circuit 16.

The semiconductor integrated circuit device of the third embodiment operates in the following way. Here, only the points that make the third embodiment differ from the first embodiment will be described.

First, when the intensity of the IFOUT2 signal is higher than the reference level, the power supply control circuit 16 controls all the first and second mixer circuits MIX1 and MIX2 and the first phase shifter 11 to operate. On the other hand, when the intensity of the IFOUT2 signal is lower than the reference level, the power supply control circuit 16 disables either of the first and second mixer circuits MIX1 and MIX2 or the first phase shifter 11 as well as either of the first and second mixer circuits MIX1 and MIX2 from operating.

After a phase shift of 90 degrees has been introduced again between the IF signals x1(t) and x2(t) in the second phase shifter 12, the IF signals x1(t) and x3(t) are added together in the adder 13 to output the IFOUT1 signal, and the IF signal x3(t) is subtracted from the IF signal x1(t) in the subtracter 14 to produce the IFOUT2 signal.

If these operations have been performed with some of the first and second phase shifters MIX1 and MIX2 and the first phase shifter 11 disabled, the quality of the IFOUT1 signal is detected in the signal quality detector 31 in order to operate the disabled circuits again.

The signal quality detector 31 checks the IFOUT2 signal for quality in terms of, for example, S/N ratio, bit error rate, packet error rate, or the like. In the event of a deterioration in the signal quality, the power supply control circuit 16 is instructed to operate the disabled circuits for image rejection because there is a possibility that the deterioration in the signal quality is caused by image interference.

If either of the first and second mixer circuits MIX1 and MIX2 is disabled, then the IF signal output from the disabled circuit is a direct-current signal as described previously in the first embodiment.

The third embodiment can provide the same advantages as the first embodiment.

In the third embodiment, the signal quality detector 31 checks the IFOUT1 signal for its quality. In the event of a degradation in the signal quality, the disabled circuit in the frequency converter can be operated again to perform image interference rejection.

Although the third embodiment has been described as operating the disabled circuit in the frequency circuit again when a deterioration in signal quality is detected by the signal quality detector 31, it is also possible to operate the disabled circuit periodically. In this case, it is required to input timing signals to the power supply control circuit 16.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor integrated circuit device comprising:
    a first phase shifter configured to make a phase difference of 90 degrees between local signals;
    first and second mixer circuits configured to mix the local signals made the phase difference with a received signal;
    a second phase shifter configured to make a phase difference of 90 degrees between output signals of the first and second mixer circuits to output first and second output signals made the phase difference;
    an adder configured to add the first and second output signals;
    a subtracter configured to subtract the first and second output signals;
    a signal intensity detector configured to compare between an intensity of an output signal of the subtracter with a reference level intensity; and
    a power supply control circuit configured to disable either of the first and second mixer circuits or either of the first and second mixer circuits and the first phase shifter according to a comparison result of the intensity of the output signal of the subtracter and the reference level intensity.

2. The semiconductor integrated circuit device according to claim 1, wherein either of the first and second mixer circuits or either of the first and second mixer circuits and the first phase shifter are disabled when the intensity of the output signal of the subtracter is less than the reference level intensity.

3. The semiconductor integrated circuit device according to claim 1, wherein either of the first and second mixer circuits or either of the first and second mixer circuits and the first phase shifter are disabled when the intensity of the output signal of the subtracter is less than S-R-M where R is an S/N ratio required by a system, S is an intensity defined by system sensitivity specifications, and M is a margin.

4. The semiconductor integrated circuit device according to claim 1, wherein the reference level intensity is a signal intensity corresponding to an output signal of the adder.

5. The semiconductor integrated circuit device according to claim 4, wherein either of the first and second mixer circuits or either of the first and second mixer circuits and the first phase shifter are disabled when the intensity of the output signal of the subtracter is less than the intensity of the output signal of the adder -R-M where R is an S/N ratio required by a system, S is an intensity defined by system sensitivity specifications, and M is a margin.

6. The semiconductor integrated circuit device according to claim 1, further comprising a filter configured to extract a disturbing signal component from a signal corresponding to the output signal of the subtracter, and wherein an intensity of the disturbing signal is compared with the reference level intensity and, according to a comparison result of the intensity of the disturbing signal and the reference level intensity, either of the first and second mixer circuits or either of the first and second mixer circuits and the first phase shifter are disabled.

7. The semiconductor integrated circuit device according to claim 6, wherein, when the intensity of the disturbing signal is less than the reference level intensity, either of the first and second mixer circuits or either of the first and second mixer circuits and the first phase shifter are disabled.

8. The semiconductor integrated circuit device according to claim 1, further comprising a first filter configured to extract a disturbing signal component from a signal corresponding to the output signal of the subtracter and a second filter configured to extract a desired signal component from a signal corresponding to an output signal of the adder, and wherein an intensity of the disturbing signal is compared with an intensity of the desired signal and, according to a comparison result of the intensity of the disturbing signal and the intensity of the desired signal, either of the first and second mixer circuits or either of the first and second mixer circuits and the first phase shifter are disabled.

9. The semiconductor integrated circuit device according to claim 8, wherein, when the intensity of the disturbing signal is less than the intensity of the desired signal, either of the first and second mixer circuits or either of the first and second mixer circuits and the first phase shifter are disabled.

10. The semiconductor integrated circuit device according to claim 8, further comprising a demodulator configured to demodulate an output signal of the second filter.

11. The semiconductor integrated circuit device according to claim 1, further comprising a signal quality detector configured to make a disabled circuits of the first and second mixer circuits and the first phase shifter to operate when a quality of an output signal of the adder is degraded.

12. The semiconductor integrated circuit device according to claim 1, further comprising an operating return circuit configured to input a timing signal to the power supply control circuit to make a disabled circuits of the first and second mixer circuits and the first phase shifter to operate periodically.

13. The semiconductor integrated circuit device according to claim 1, wherein, according to the comparison result, the signal intensity detector is disabled.

14. The semiconductor integrated circuit device according to claim 13, wherein, when the intensity of the output signal of the subtracter is less than the reference level intensity, the signal intensity detector is disabled.

15. The semiconductor integrated circuit device according to claim 1, wherein the reference level intensity is a signal intensity corresponding to a minimum receivable level.

16. The semiconductor integrated circuit device according to claim 1, wherein, when the intensity of the output signal of the subtracter is more than the reference level intensity, the first and second mixer circuits and the first phase shifter are all operated.

17. The semiconductor integrated circuit device according to claim 1, wherein an image frequency component only is extracted by subtracting the first and second output signals.

* * * * *